Figures 1, 2:
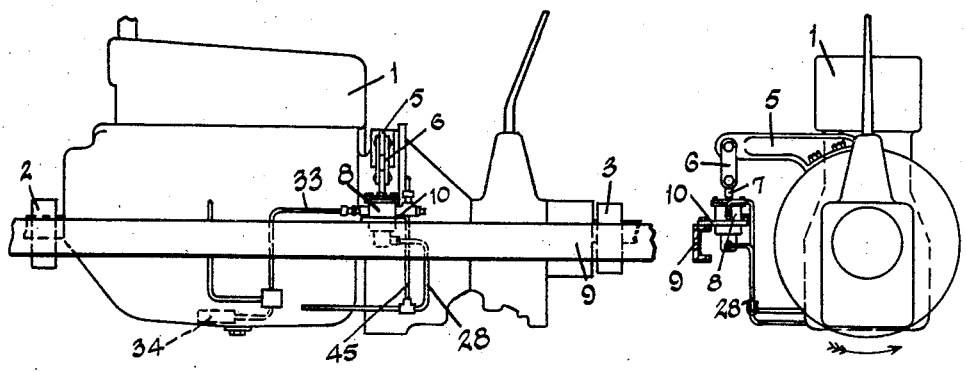

Nov. 22, 1932.  F. J. LAPOINTE  1,888,460

MOTOR COUNTER REACTANT DEVICE

Filed March 7, 1932

Inventor
Francis J. Lapointe

Attorney

Patented Nov. 22, 1932

1,888,460

UNITED STATES PATENT OFFICE

FRANCIS J. LAPOINTE, OF ANN ARBOR, MICHIGAN

MOTOR COUNTER REACTANT DEVICE

Application filed March 7, 1932. Serial No. 597,195.

My invention has for its object to provide an efficient yielding means for resisting the reactive turning moment occurring in an engine when the power applied against the load is rapidly increased, the inertia of the load reacting through the crank shaft to cause a force that is applied to the body of the engine in a direction that tends to turn the engine over sidewise opposite to the direction of rotation of the shaft, such rotation of the engine being ordinarily resisted by its supporting bed or frame. Ordinarily the engine is securely bolted to the chassis, where the engine is installed in an automobile, or to its supporting bed or blocks where the engine is a stationary engine, and the chassis or the bed, as the case may be, positively resists the turning moment of the reactive force and produces substantially an immovable structure. The positive resistance to the turning moment causes wear in the cylinder walls and vibration of the engine that is transmitted to the chassis or other supporting means.

By my invention I have provided a novel means for normally sustaining the engine in a position by a substantially constant pressure that is opposed to the reactive pressure produced in driving the crank shaft. The said yielding pressure being of such a character that it will yield when an abnormal turning force or pressure is applied. Furthermore, the opposing pressure remains substantially constant notwithstanding the amount of deflection and during the gradual return of the engine to its normal position, that is during the reduction of the extreme reactive force to that amount which is normally maintained when the relation between the load and the power applied by the engine is normal. The constant yielding pressure will cause a steady return of the engine to its normal position. Thus vibration produced by reason of the immovability of the engine, or by reason of the use of elastic engine turning resistant members that have been heretofore used, is entirely eliminated.

In the preferred embodiment of the invention, the engine oiling system is utilized to produce an oil pressure counter to the turning moment exerted on the engine and produce a constant yielding resistance to the movement of the engine and causes the gradual return of the engine to its normal position and when the normal relation between the load and the power applied to the engine is restored.

The invention may be contained in engine balancers of different forms and the structures containing the invention may be varied in their details. To illustrate a practical application of the invention, I have selected an engine counterbalancing means that embodies the invention as an example of the various structures, and the details of such structures that contain the invention, and shall describe it hereinafter, it being understood that variations may be made and that certain features of my invention may be used to advantage without a corresponding use of other features of the invention, and without departing from the spirit of the invention. The particular structure selected is shown in the accompanying drawing.

Figure 3:
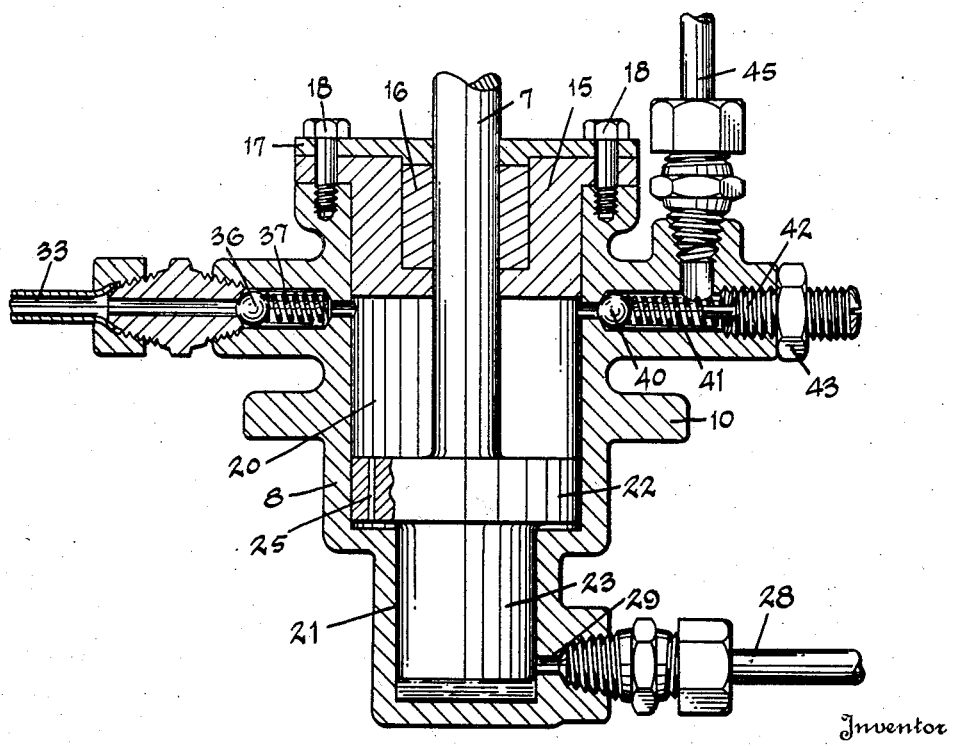

Fig. 1 of the drawing illustrates a diagrammatic view of an automobile engine and the engine balancer applied thereto. Fig. 2 illustrates an end view of the structure shown conventionally in Fig. 1. Fig. 3 is a view of a section of the engine balancer.

In the form of construction shown in the drawing, the engine 1 is supported on the ends of the crank shaft which extends through suitable cross or frame members 2 and 3 of the chassis and the fly wheel housing of the engine, in the manner well known in the art. The body of the engine is pivotally supported on the ends of the crank shaft and is thus rotatable relative to the chassis or body of the automobile. In the construction illustrated, the body of the engine is connected to a member that resists the turning movement of the engine by a force that remains constant notwithstanding the angle of deflection of the engine from the normal.

In the particular form shown, the engine body at any suitable point is provided with an arm 5. The crank shaft of the engine rotates in a direction of the arrow and the reactive force against the side walls of the cylinders tends to move the body of the engine angularly on the crank shaft in the opposite direction. The arm 5 is connected by means of the link 6 to the movable member of a piston and cylinder combination wherein oil under pressure constitutes a resisting medium to movement of one of the members relative to the other. As shown in the drawing, the link 6 is connected to the piston 7. The piston 7 is located in the cylinder 8 which is connected to the side bar 9 of the chassis of an automobile. The cylinder 8 may be connected to the side bar of the chassis by any suitable bracket, such as the flange 10, that may be formed integral with the cylinder wall 8. The cylinder 8 is connected to a suitable pump for producing an oil pressure within the cylinder.

The cylinder 8 is provided with a cover plate 15 having a packing recess 16 that may be closed by a suitable plate 17 that may be secured to the cover plate 15 and to the end of the cylinder by suitable studs 18. In the form of construction shown in the drawing, the cylinder 8 is formed of two parts, one of which is larger in diameter than the other. The part 20 has a diameter larger than the part 21. The piston 7 has a piston head having parts of two diameters. The larger part 22 of the piston head substantially fits the larger cylinder 20 and the smaller piston head part 23 substantially fits the cylinder part 21. The normal position of the piston is as indicated in Fig. 3. The force that tends to turn the engine operates in a direction to raise the arm 5 if it is sufficiently great to overcome the oil pressure exerted upon the larger part of the piston. The piston head part 22 is provided with a small duct 25 that allows the oil to move through from one side of the piston head part 22 to the other side. During this first, or initial, movement of the piston, the resistance is appreciably greater than during the subsequent movement of the piston by reason of the fact that the part 23 of the piston is socketed in the part 21 of the cylinder. The continued upward movement of the piston, however, is resisted by a steady pressure produced by the oil within the cylinder part 20 which gives opportunity for the engine to overcome the inertia of the load and reduce the effect of the repeated impacts due to the explosions occurring intermediate the pistons and the cylinder heads of the engine and consequently greatly reduces the vibration and the wear and tear that the engine would normally be subjected were it securely fastened to the frame or chassis of an automobile.

The lower end of the cylinder 8 is connected to a pipe 28 which communicates with a port 29 located at a point slightly above the bottom of the part 21 of the cylinder and which is normally covered by the part 23 of the piston. The pipe 29 forms a return for the oil that leaks or seeps by the piston into the lower part of the cylinder. The port 29 being much smaller than the diameter of the part 21 provides some restriction to the sudden return of the piston 23 by the pressure of the oil that exists at all times in the cylinder part 20. Just before the completion of the return stroke of the piston, the port 29 is closed and rapidly decreases the speed of the piston and cushions the return of the piston and prevents a sudden impact of the piston against the lower end of the cylinder, the dimensions being such that oil will be pocketed below the lower end of the part 23 of the piston and below the port 29 in the part 21 of the cylinder.

In the initial upward movement of the piston 7, the part 23 being socketed in the part 21 and the port 29 being closed, the piston will not move upon the first application of an abnormal reactive force, but will operate to largely sustain it and upon continued application of the reactive force the piston will move to cushion the application of the power in driving the crank shaft. The movement of the piston, however, will continue to be resisted by the pressure of the oil, the pressure, however, yielding by reason of the movements of the oil through the restricted passageway 25. The return movement of the piston and the engine body will be produced by the pressure of the oil that is introduced into the cylinder 20. Some of the oil located below the piston 22 will pass the piston part 23 into the lower end of the part 21 of the cylinder and some of the oil will pass through the duct 25 to the upper side of the part 22 of the piston. At the completion of the return stroke the piston will be cushioned not only by the trapped oil on the under side of the larger piston part, but also by that below the end of the part 23 and by the gradual cutting off of the port 29 by the lower end of the piston 23 which will prevent any shock caused by the return of the piston. Thus the engine body will be allowed to deflect for a period sufficiently long to permit the inertia of the load to be overcome by the pressures in the cylinders of the engine and until a substantially normal relationship between the power applied and the load is established.

The cylinder 20 may be connected through the pipe 33 to the lubricating pump 34 of the engine. If desired, the cylinder wall may be provided with a suitable valve 36 that is spring pressed by means of the spring 37 to insure distribution of the oil to the bearings which are lubricated by the operation of the pump. Also, in order to insure the required pressure of the oil within the cylinder, a spring pressed valve 40 may be located in the cylinder wall. The opening of the valve is resisted by means of the spring 41, the spring 41 operating to yieldingly prevent the escape of the oil from the cylinder. The pressure of the oil within the cylinder 20 may thus be regulated by regulating the tension of the spring 41. In the construction shown, an adjustable screw 42 is threaded into a boss formed on the cylinder wall and is secured in its adjusted position by means of the lock nut 43.

The construction described will thus produce a substantially constant pressure to resist the turning movement due to the abnormal driving force applied to the crank shaft of the engine, the resisting force being constant notwithstanding the angle that the engine is deflected. The structure also produces a gradual return of the engine to its normal position as the substantially normal relationship between the inertia of the load and the applied force is gradually approached. Thus the device operates to eliminate all vibration since it eliminates all elastic pressure members or mediums and maintains a substantially constant pressure when the engine is deflected from the normal.

I claim:

1. In a motor reactant device, means for rotatably supporting the stator and rotor of the motor, a fixed member, a fluid pressure power means having relatively movable parts one of the parts connected to the stator of the motor and the other connected to the fixed member, and means for maintaining a substantially constant fluid pressure in the power means to normally maintain the stator in a predetermined position and to return it to said position by said pressure when deflected therefrom.

2. In an internal combustion engine, means for rotatably supporting the engine body, a fixed member, coacting piston and cylinder parts, one of the parts connected to the fixed member and the other connected to the engine body, means for producing a fluid pressure in the said cylinder to normally maintain the engine body in a predetermined position and resist deflection therefrom.

3. In an internal combustion engine, means for rotatably supporting the engine body, a fixed member, coacting piston and cylinder parts, each of the piston and cylinder parts having portions of two diameters, the piston portion of larger diameter having a restricted duct, one of the parts connected to the fluid member and the other connected to the engine body, means for producing a fluid pressure in the said cylinder to normally maintain the engine body in a predetermined position and resist deflection therefrom.

4. In an internal combustion engine, means for rotatably supporting the engine body, a fixed member, coacting piston and cylinder parts, each of the piston and cylinder parts having portions of two diameters, the piston portion of larger diameter having a restricted duct and the smaller cylinder portion having an outlet port adapted to be covered by the smaller piston portion, the cylinder portion below the piston and the port forming a fluid pocket.

In witness whereof I have hereunto signed my name to this specification.

FRANCIS J. LAPOINTE.